United States Patent
Wheelwright (10) Patent No.: US 7,347,444 B2
(45) Date of Patent: Mar. 25, 2008

(54) INFLATABLE AIRBAG WITH OVERLAPPING CHAMBER

(75) Inventor: Terry A. Wheelwright, Morgan, UT (US)

(73) Assignee: Autoliv ASP, Inc., Ogden, UT (US)

( * ) Notice: Subject to any disclaimer, the term of this patent is extended or adjusted under 35 U.S.C. 154(b) by 312 days.

(21) Appl. No.: 10/841,342

(22) Filed: May 6, 2004

(65) Prior Publication Data

US 2005/0248132 A1    Nov. 10, 2005

(51) Int. Cl.
    *B60R 21/24*    (2006.01)
(52) U.S. Cl. .................................... 280/729; 280/730.2
(58) Field of Classification Search ................ 280/729, 280/740, 730.1, 730.2, 743.1
    See application file for complete search history.

(56) References Cited

U.S. PATENT DOCUMENTS

| | | | |
|---|---|---|---|
| 3,843,150 A | 10/1974 | Harada et al. | |
| 5,324,072 A | 6/1994 | Olson et al. | |
| 5,573,270 A * | 11/1996 | Sogi et al. | 280/740 |
| 5,586,782 A | 12/1996 | Zimmerman, II et al. | |
| 5,791,685 A | 8/1998 | Lachat et al. | |
| 5,803,485 A | 9/1998 | Acker et al. | |
| 6,302,433 B1 * | 10/2001 | Ellerbrok et al. | 280/729 |
| 6,349,964 B1 | 2/2002 | Acker et al. | |
| 6,561,541 B2 * | 5/2003 | Vendely et al. | 280/730.2 |
| 2002/0185845 A1 | 12/2002 | Thomas et al. | |
| 2003/0160433 A1 * | 8/2003 | Kumagai et al. | 280/729 |
| 2003/0178831 A1 | 9/2003 | Roberts et al. | |
| 2003/0184061 A1 | 10/2003 | Honda et al. | |
| 2004/0150199 A1 | 8/2004 | Hofmann | |
| 2004/0232666 A1 | 11/2004 | Sato et al. | |
| 2005/0062266 A1 * | 3/2005 | Steimke et al. | 280/730.2 |

FOREIGN PATENT DOCUMENTS

| | | |
|---|---|---|
| DE | 102 11 232 A1 | 10/2003 |
| EP | 0 847 902 B1 | 4/2003 |
| EP | 1 340 656 A2 | 9/2003 |
| JP | 11-227553 | 8/1999 |

* cited by examiner

*Primary Examiner*—Ruth Ilan
*Assistant Examiner*—Drew J. Brown
(74) *Attorney, Agent, or Firm*—Sally J Brown; Madson & Austin (57) ABSTRACT

An inflatable side airbag apparatus having a thorax cushion and an independently inflatable overlapping high pressure pelvic cushion is disclosed. The airbag system provides for rapid deployment of the pelvic cushion. The thorax cushion inflates adjacent to and provides impact protection for an occupant's thorax and pelvis in a lateral collision. The pelvic cushion inflates between the thorax cushion and the side structure of the vehicle and provides impact protection for the occupant's pelvis. The airbag system also includes an inflator having a gas guide that is in fluid communication with both cushions, and inflates the pelvic cushion to a higher pressure than the thorax cushion. The thorax cushion further includes a diffuser hood for diverting inflation gas toward the pelvic region of the cushion, thereby rapidly positioning the pelvic cushion in its intended deployment position.

20 Claims, 5 Drawing Sheets

INFLATABLE AIRBAG WITH OVERLAPPING CHAMBER

BACKGROUND OF THE INVENTION

1. Field of the Invention

The present invention relates to automobile airbag systems and apparatuses. More specifically, the present invention relates to airbags having independently inflatable overlapping cushions.

2. Description of Related Art

Safety belts are designed to protect the occupants of a vehicle during events such as automobile collisions. In low-speed collisions, the occupants are generally protected from impact with objects located inside the vehicle such as the windshield, the instrument panel, a door, the side windows, or the steering wheel by the action of the safety belt. In more severe collisions, however, even belted occupants may experience an impact with the car's interior. Airbag systems were developed to supplement conventional safety belts by deploying into the space between an occupant and an interior object or surface in the vehicle during a collision event. The airbag acts to decelerate the occupant, thus reducing the chances of injury to the occupant caused by contact with the vehicle's interior.

Many typical airbag systems consist of several individual components joined to form an operational module. Such components generally include an airbag cushion, an airbag inflator, a sensor, and an electronic control unit. Airbag cushions are typically made of a thin, durable fabric that is folded to fit into a compartment of a steering wheel, dashboard, interior compartment, roof, roof rail, seat, or other space in a vehicle. The airbag inflator is designed to produce a gas to rapidly inflate the cushion when needed. The sensors detect sudden decelerations of the vehicle that are characteristic of an impact. The readings taken by the sensors are processed in the electronic control unit using an algorithm to determine whether a collision has occurred.

Upon detection of an impact of sufficient severity, the control unit sends an electrical signal to the inflator. The inflator uses one of many technologies, including pyrotechnic compounds and pressurized gas, to produce a volume of inflation gas. The inflation gas is channeled into the airbag, rapidly inflating it. Inflation of the airbag causes it to deploy, placing it in position to receive the impact of a vehicle occupant. After contact of the occupant with the airbag and the corresponding deceleration of the occupant, the airbag deflates, freeing the occupant to exit the vehicle.

Airbag apparatuses have been primarily designed for deployment in front of an occupant between the upper torso and head of an occupant and the windshield or instrument panel. However, alternative types of airbags such as knee bolsters and overhead airbags operate to protect various parts of the body from collision. Side impact airbags such as inflatable curtains and seat mounted airbags also have been developed in response to the need for protection from impacts in a lateral direction, or against the side of the vehicle.

It has been discovered that various parts of the body require different levels of impact protection. For example, a seat mounted airbag may inflate beside an occupant in a vehicle seat to protect the pelvis and thorax of the occupant against lateral impact. The weight of the occupant may generally tend to slide with the pelvis; hence, it may be beneficial for the pelvic portion of the seat mounted airbag to inflate stiffly to provide comparatively firm protection. By contrast, the thorax is more sensitive and generally carries less mass, and thus should preferably be more softly cushioned during impact to avoid potential injury to an occupant's ribs.

Recently, dual chambered side impact airbags have been developed to provide a pressure differential between the pelvic and thorax portions of a side airbag. These airbags have two separate chambers, one on top of the other. The top chamber is used for providing impact protection for the thorax of an occupant in a seat and the bottom chamber is used to provide impact protection for an occupant's pelvis. In these systems an inflator is placed in a housing that has multiple orifices for channeling inflation gases into both chambers. The pelvic chamber is inflated to a higher pressure than that of the thorax chamber.

As with other types of airbags, thorax/pelvic airbags must be deployed rapidly in order to be effective. When a vehicle or some other object impacts the side of another vehicle, the side airbag must deploy in a matter of milliseconds. However, the airbag industry has experienced difficulty in deploying the lower pelvic portion of the side airbag in its intended position in a sufficient time period. This is because intrusion into the vehicle compartment generally occurs at or near the pelvic region due to the location of the colliding vehicle's bumper. If the pelvic portion of the side airbag is not positioned before significant intrusion occurs, the deploying side airbag may rebound off the armrest on the vehicle door, or otherwise be prevented from deploying in its proper position, possibly compromising the physical safety of the occupant.

Accordingly, it would be desirable to develop a side airbag system that can rapidly and timely position the pelvic portion of the inflatable cushion in its intended position to provide effective impact protection for a passenger. It would further be desirable to have an airbag assembly capable of having at least two inflatable portions that are inflated to different pressures while simultaneously maintaining its ability to position itself in a rapid and timely manner. It is also desirable to provide a side impact airbag cushion that is firm enough to prevent strikethrough of the occupant's pelvis while simultaneously being soft enough to provide adequate impact protection while limiting the possibility of being injured by the bag itself. Such a device is described and claimed herein.

BRIEF SUMMARY OF THE INVENTION

The apparatus of the present invention has been developed in response to the present state of the art, and in particular, in response to the problems and needs in the art that have not yet been fully solved by currently available airbag systems. Thus, the present invention provides an airbag system having overlapping, independently inflatable cushions with different internal pressures.

In accordance with the invention as embodied and broadly described herein in the preferred embodiment, an airbag system with overlapping cushions is provided. According to one configuration, the airbag system may be used in side-impact airbag applications. However, the present invention may alternatively be used in other systems such as frontal driver's side or passenger side airbag systems, inflatable curtain systems, knee airbag systems and overhead airbag systems.

With respect to side airbag applications, one embodiment of the present invention includes a first inflatable cushion that deploys adjacent a vehicle occupant in a lateral collision. The first inflatable cushion protects both the thorax and pelvic regions of the occupant's body in a lateral collision.

Alternatively, the first inflatable cushion may protect the head and thorax regions in a lateral collision. The first inflatable cushion is inflated to a pressure that will prevent strikethrough of an occupant's thorax, but will not be inflated too firmly in order to prevent injury to an occupant's ribs.

A second inflatable cushion is located adjacent the first inflatable cushion on an outboard side of the first inflatable cushion. The second inflatable cushion inflates independently of the first inflatable cushion and at a higher pressure than the first. The second inflatable cushion provides impact protection for the pelvis of a vehicular occupant. The higher pressure of the second inflatable cushion prevents strikethrough of the occupant's pelvis. Without the higher pressure level, strikethrough would occur if only the first inflatable cushion were used at its uniformly lower pressure level since an occupant has a higher concentration of mass in the pelvic region than the thorax region.

A single inflator for providing inflation gas may be used to inflate both cushions. Alternatively, multiple inflators may be used. The inflator may include a housing with mounting studs and a gas guide. The gas guide has two orifices for directing inflation gas into both chambers simultaneously. The relative sizes of the orifices work to regulate pressures in the two cushions.

The inflator may be inserted into the airbag through a throat. The throat has mounting stud holes shaped to receive corresponding mounting studs from the inflator housing. When the inflator is positioned into its pre-formed mounting stud holes, the gas guide is positioned such that one orifice is in fluid communication with the first inflatable cushion while the other orifice is in fluid communication with the second inflatable cushion. A seal which may comprise a seam or other similar structure may serve to separate the two cushions so that they inflate independent of each other, i.e., the two cushions are not in fluid communication with each other.

The present invention solves the problem of timing by positioning the airbag apparatus in its intended location upon deployment before intrusion into the passenger compartment blocks or otherwise interferes with the deployment of the airbag. For example, the time required to have the pelvic portion of a side airbag fully and properly deployed may be less than seven milliseconds because in lateral collisions, intrusion into the vehicle compartment usually first occurs at or near the pelvic region due to contact with the colliding vehicle's bumper. If the pelvic portion of the airbag does not deploy rapidly enough it may rebound off of the armrest or other structure and not deploy properly.

In order to rapidly deploy the second inflatable pelvic cushion, a deflection hood may be used in the first inflatable cushion. The deflection hood is a piece of fabric or webbing that surrounds the inflator and forms a hood. The deflection hood is often called a looped diffuser because it forms a loose loop around the inflator body and directs the inflation gas upon activation of the inflator. The hood is sewn closed at its top end and is open at its bottom end to direct inflation gas downward toward the pelvic region of the first inflatable cushion.

As the pelvic region of the first inflatable cushion inflates, it simultaneously positions the inflating second cushion into its designated position, since the two cushions share a fabric panel between each other. Consequently, the second inflatable cushion is rapidly positioned in its intended deployment location to provide adequate impact protection for an occupant's pelvis through the use of the deflection hood in the first inflatable cushion.

After the inflation gas is initially shunted into the pelvic portion of the first inflatable cushion, it diffuses into the thorax portion, thus inflating the entire first cushion. Additionally, a hole may be placed in the upper portion of the deflection hood to ensure that the thorax portion of the first inflatable cushion fully deploys in a timely manner. These and other features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the inflatable airbag system of the present invention, as represented in FIGS. 1A through 6, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrase "attached directly to" refers to a form of attachment by which the attached items are either in direct contact, or are only separated by a single fastener, adhesive, or other attachment mechanism.

Figure 1A:
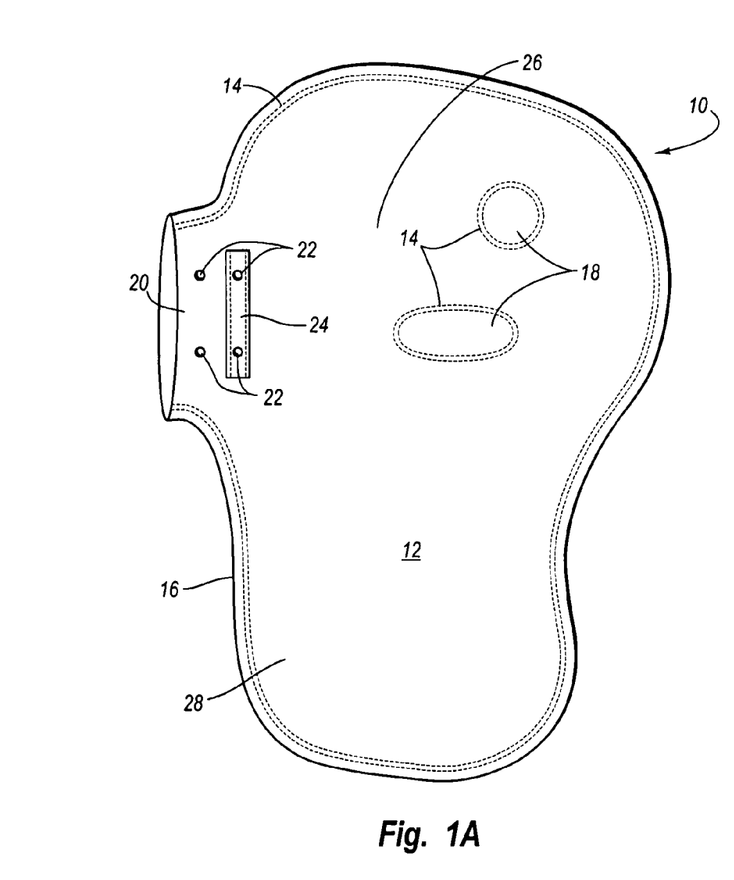
FIG. 1A is a side plan view of an inboard surface of a side impact airbag of the present invention before insertion of an inflator.

Referring to FIG. 1A, a side impact airbag 10 of the present invention is depicted from a side plan view of an inboard side 12 of the airbag 10. The inboard side 12 is the side of the airbag 10 that is facing toward the inside of a vehicle. Side impact airbags 10 typically deploy from a position in a vehicle seat (not shown) adjacent the seat's occupant, such that the airbag 10 is positioned between the occupant and a side structure of the vehicle. The side of the airbag 10 that would be contacted by an occupant in a lateral-collision impact situation is the inboard side 12 of the airbag 10.

The side impact airbag 10 is constructed of several fabric panels, sewn together by stitching 14 located on a peripheral edge 16 of the airbag 10. The panels may also be sewn together through stitching 14 in a non-peripheral area of the airbag 10. Some forms of non-peripheral stitching 14 create zero-length tethers 18 in the airbag 10. Zero-length tethers 18 are where the inboard side 12 panel is attached directly to an outboard side panel (shown in FIG. 1B), such that there is no appreciable distance between the panels of the airbag 10 at the location of the zero-length tethers 18. Zero-length tethers 18 are used to control the width of the airbag 10 when it is inflated. Without internal tethers 18 the airbag 10 would have a tendency to form a spherical shape upon inflation and deployment. The zero-length tethers 18 are located at specific distances away from the peripheral edge 16 of the airbag 10 in order to give the airbag 10 a specific thickness between the peripheral edge 16 and the tether 18 upon deployment.

A portion of the peripheral edge 16 of the side airbag 10 does not have stitching 14 that interconnects the fabric panels. This portion of the airbag 10 forms a throat 20 which serves to receive an inflator (not shown). The throat 14 has a plurality of mounting stud holes 22 which correspond to mounting studs located on the inflator or its housing. The throat 20 is designed to receive the inflator in a position corresponding to a reinforced panel 24 on the airbag 10. Once the inflator is positioned adjacent the reinforced panel 24, the throat 20 is folded over the inflator in order to seal the throat 20. The inflator/airbag assembly is then mounted in its designated mounting location (not shown) within the vehicle.

The inboard side 12 of the airbag 10 has an inflatable chamber that covers both a thorax region 26 and a pelvic region 28. The thorax region 26 is the upper, wider portion of the airbag 10 that is designed to be adjacent the occupant's thorax, i.e., the area between the neck and diaphragm, namely the portion of the occupant's body that includes the occupant's ribs. The pelvic region 28 is the lower, narrower portion that is designed to be adjacent the occupant's pelvis.

The side airbag 10 depicted in FIG. 1A is constructed to deploy adjacent to a projected position of the occupant. The projected position of the occupant is the area within the vehicle where airbag manufacturers and engineers predict would be the likely and anticipated position of an occupant while seated in his seat. However, the present invention is not limited to side airbag applications. It may also be used, among other things, in the context of head/thorax airbags, inflatable curtain airbags, driver's side and passenger side frontal-impact airbags, knee airbags, or overhead airbag applications.

Figure 1B:
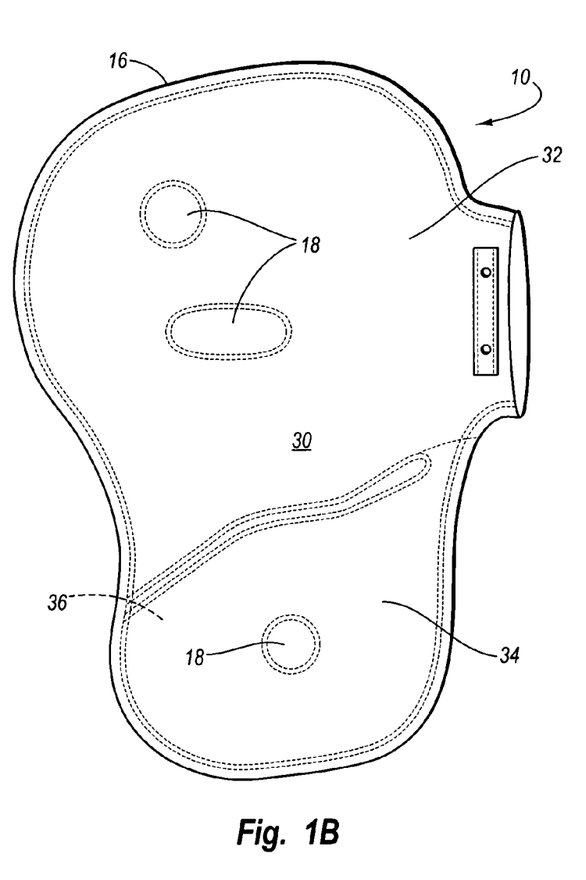
FIG. 1B is a side plan view of the outboard surface of the side impact airbag depicted in FIG. 1A before insertion of the inflator.

Referring to FIG. 1B, the side impact airbag 10 of FIG. 1A is depicted from a side plan view, illustrating the outboard side 30 of the airbag 10. The outboard side 30 is the side of the airbag 10 that is designed to be facing toward the outside of the vehicle upon deployment. When the side airbag 10 is fully inflated and deployed, the side that would contact the side-structure of the vehicle in a lateral collision is the outboard side 30.

The view of the outboard side 30 of the airbag 10 depicts a thorax/pelvic cushion 32 is overlapped by a pelvic cushion 34. The two cushions 32, 34 are independent of each other in that they are inflatable independent of each other. There is no significant means of fluid communication between the two cushions 32, 34 once the inflator (not shown) is positioned in the airbag 10. If inflation gas were directed into only the thorax/pelvic cushion 32, only the thorax/pelvic cushion 32 would inflate. Inflation gas would not pass to the pelvic cushion 34 in any appreciable sense.

The thorax/pelvic cushion 32 extends the entire profile of the side airbag 10. The thorax/pelvic cushion 32 can be viewed in its entirety from the perspective shown in FIG. 1A. The thorax/pelvic cushion 32 provides impact protection for an occupant's pelvis and thorax in the event of a lateral collision. The thorax/pelvic cushion 32 is constructed from sewing two fabric panels together around their peripheral edges 16.

As shown in FIG. 1B, the pelvic cushion 34 is limited to the area adjacent the pelvis of a projected position of an occupant. The pelvic cushion 34 provides impact protection for an occupant's pelvis in the event of a lateral collision. The pelvic cushion 34 is constructed from sewing a third panel 36 of fabric to the outboard side 30 panel of the thorax/pelvic cushion 32. The third panel 36 is smaller than the two panels used in constructing the thorax/pelvic cushion 32. The third panel 36 may be sewn either between the outboard side 30 and inboard side 12 panels of the thorax/pelvic cushion 32, or alternatively, it may be sewn on the exterior of the outboard side 30 panel of the thorax/pelvic cushion 32.

Figure 1C:
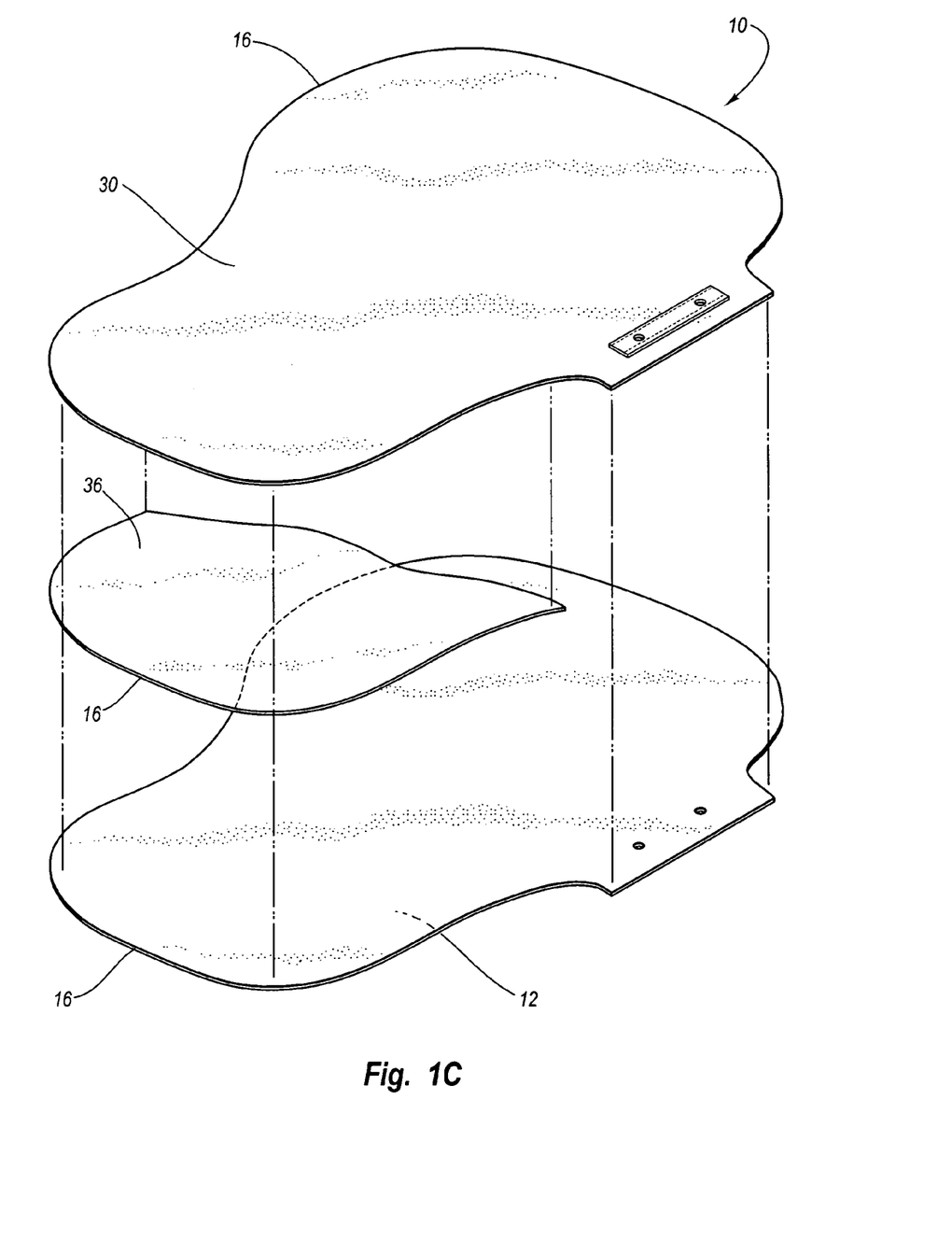
FIG. 1C is an exploded, perspective view of fabric panels that comprise the side impact airbag depicted in FIG. 1A.

FIG. 1C depicts how the embodiment shown in FIGS. 1A and 1B may be constructed. The airbag 10 is illustrated from an exploded perspective view with the third panel 36 between the inboard side 12 panel and the outboard side 30 panel. The third panel 36 is attached to the outboard side 30 panel along its peripheral edge 16 defining the pelvic cushion 34. The outboard side 30 panel and the inboard side 12 panel are then attached to each other (with the third panel 36 between) to define the thorax/pelvic cushion 32.

Referring collectively to FIGS. 1A, 1B, and 1C, the pelvic cushion 34 overlaps the thorax/pelvic cushion 32, in that it provides for a dual-depth airbag adjacent an occupant's pelvis. The pelvic cushion 34 is intended to be inflated to a higher pressure than that of the thorax/pelvic cushion 32 so that an occupant will not strikethrough the cushions 32, 34. Strikethrough occurs when the internal pressure of the bag is insufficient to prevent the impinging occupant from passing through the depth of the airbag cushion and contacting the hard structure that the airbag was intended to provide impact protection for. To prevent strikethrough of an occupant's pelvis, the internal pressure of the pelvic cushion 34 may be between 200 and 240 kilopascals.

The thorax/pelvic cushion 32 preferably has a lower pressure level compared to the pelvic cushion 34 when inflated. The typical pressure level of the thorax/pelvic 32 cushion is between 60 and 80 kilopascals, significantly less than that of the pelvic cushion 34. The lower pressure is desirable to provide a softer impact surface for an occupant's thorax in order to prevent injury to the occupant's ribs when the occupant strikes the airbag 10 in a collision. The concentration of mass of an occupant's thorax is less than that of an occupant's pelvis, so higher pressure is not needed to prevent strikethrough.

Moreover, by having the thorax/pelvic cushion 32 extend adjacent both the thorax region and the pelvic region of the occupant, the occupant's pelvis has greater impact protection through overlapping cushions 32, 34 providing dual depth impact protection. In a collision scenario, the thorax/pelvic cushion 32 will cushion the impinging occupant's pelvis. However, the thorax/pelvic cushion 32 is insufficient to prevent strikethrough of the occupant's pelvis during a lateral impact. The pelvic cushion 34, therefore, is provided with sufficient pressure to prevent strikethrough of the occupant's pelvis against the side structure of the vehicle. However, the occupant's pelvis does not contact the pelvic cushion 34 until it has already been impeded and cushioned by the thorax/pelvic cushion 32. Consequently, the airbag 10 of the present invention provides for dual-depth impact protection adjacent an occupant's pelvis.

Figure 2:
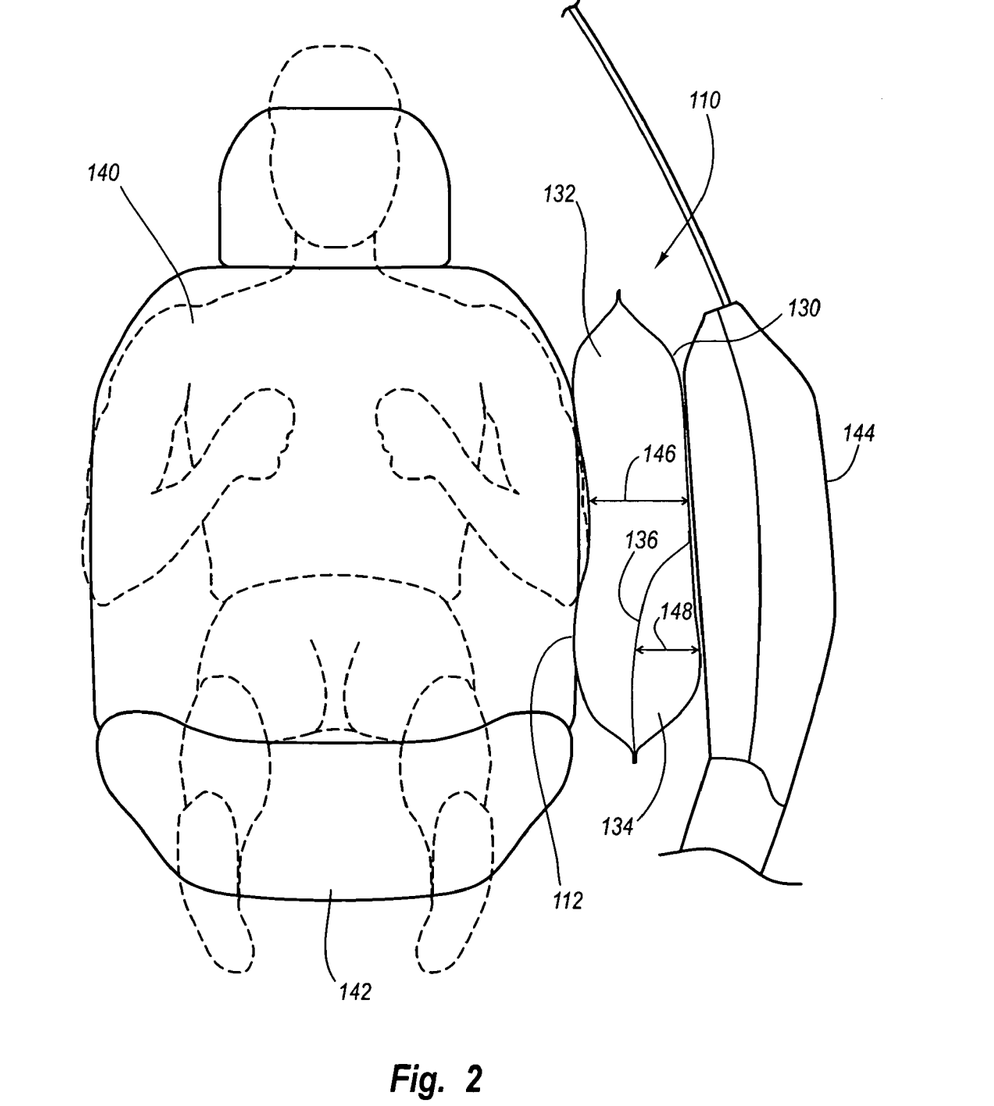
FIG. 2 is cross-sectional view of an inflated side impact airbag of the present invention adjacent a vehicle passenger, as viewed from the front of the partially cut-away vehicle, looking rearward.

Referring to FIG. 2, a fully-deployed side impact airbag 110 of the present invention is depicted from a cross-sectional view adjacent a vehicle occupant 140 (illustrated in phantom), as viewed from the front of a vehicle, looking rearward. The occupant 140 is shown sitting in a vehicle seat 142 adjacent a side structure 144 of the vehicle. The side impact airbag 110 deploys between the occupant 140 and the side structure 144 of the vehicle. The airbag 110 is configured to provide impact protection for the thorax and pelvic regions of the occupant 140.

The side impact airbag 110 has two independently inflatable cushions: a thorax/pelvic cushion 132 and a pelvic cushion 134. The deployed thorax/pelvic cushion 132 extends from a position adjacent the occupant's 140 thorax, down to the occupant's 140 pelvis, on an inboard side 112 of the airbag 110. The pelvic cushion 134 provides impact protection for the pelvic region of the occupant 140. The pelvic cushion 134 is located on an outboard side 130 of the airbag 110, between the side structure 144 of the vehicle and the thorax/pelvic cushion 132.

The side impact airbag 110 is constructed of two fabric panels, one on the inboard side 112, and one on the outboard side 130. Between the two panels is a third panel 136. The third panel 136 separates the thorax/pelvic cushion 132 from the pelvic cushion 134. Alternatively, the third panel 136 may be attached to the outboard side 130 panel adjacent the side structure 144 of the vehicle.

The pelvic cushion 134 overlaps the thorax/pelvic cushion 132, such that it is between the thorax/pelvic cushion 132 and the side structure 144 of the vehicle. The resulting airbag system 110 provides dual-depth impact protection for the occupant's 140 pelvis. The thorax/pelvic cushion 132 may have a depth 146 of about eight inches, while the pelvic cushion 134 has a depth 148 of about five centimeters. However, the depths 146, 148 of the two cushions 132, 134 may vary depending upon the configuration of the vehicle, such as the distance between the seat 142 and the side structure 144 of the vehicle. Typically, the thorax/pelvic cushion 132 has a greater depth than that of the pelvic cushion 134.

The pelvic cushion 134 is inflated to a higher pressure than the thorax/pelvic cushion 132 in order to prevent strikethrough of the occupant's 140 pelvis. As a result, the thorax/pelvic cushion 132 provides for softer impact protection for the occupant's 140 thorax and pelvis. Conversely, the pelvic cushion 134 provides for more firm impact protection, preventing the pelvis of the occupant 140 from passing through the airbag 110 and impinging against the side structure 144 of the vehicle.

Figure 3:
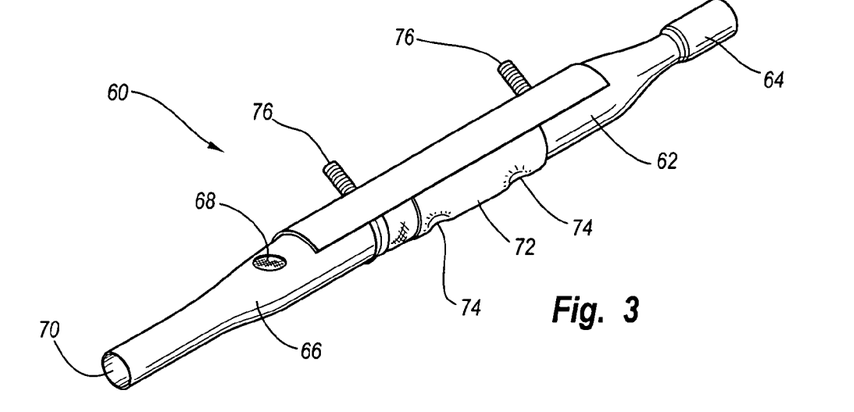
FIG. 3 is a perspective view of an inflator assembly used to inflate the airbag cushion of the present invention.

Referring to FIG. 3, an inflator assembly 60 used to inflate the airbag cushions of the present invention is illustrated from a perspective view. An inflator 62 is used to generate inflation gas to rapidly inflate the airbag (not shown) of the present invention. The inflator 62 is a pyrotechnic device that uses the combustion of gas-generating material to generate inflation gas. Alternatively, the inflator 62 contains a stored quantity of pressurized inflation gas, or a combination of pressurized inflation gas and ignitable material for heating the inflation gas.

The inflator 62 has a squib 64 that is connected to an electronic control unit (not shown) via wiring. A signal from the electronic control unit causes the inflator 62 to activate, generating exhaust gas. The exhaust gas is channeled into a gas guide 66 for delivering inflation gas to each of the inflatable cushions of the airbag of the present invention.

The gas guide 66 is a tapered, tubular-like member that is crimped onto the end of the inflator 62 opposite the squib 64. The gas guide 66 has a thorax chamber orifice 68 and a pelvic chamber orifice 70 which serve as exit ports for the inflation gas. The diameter of each orifice 68, 70 regulates the pressure of the corresponding cushion that is in fluid communication with the orifice. The larger the orifice, the greater amount of inflation gas that can pass there through, resulting in an increased internal pressure of the corresponding cushion.

The gas guide 66 also acts as a diffuser. In side impact airbag applications, the inflator 62 is installed within or in close proximity to the textile airbag. Due to the fact that the airbag assembly must be installed into limited space, the airbag is often folded up against the inflator 62. Without a diffuser, the hot gas that exits the inflator 62 would impinge against the airbag, which may cause the gas to burn one or more holes in the airbag. Holes may cause the airbag to inflate improperly. The gas guide 66 allows the inflation gas to expand and cool as it flows through the gas guide 66. Furthermore, heat may be transferred from the inflation gas to the surface of the gas guide 66. Once inflation gas passes through the gas guide 66, the gas is sufficiently cooled and/or not concentrated so as not to burn holes in the textile airbag.

The inflator assembly 60 also includes an inflator housing 72 having a substantially tubular shape. The inflator housing 72 includes inwardly directed dimples 74 causing the housing 72 to tightly circumscribe the inflator 62 in order to maintain the inflator 62 within the housing 72 upon activation. Typically, the inflator 62 is press fitted within the housing 72. The housing 72 also has pre-installed mounting studs 76 extending orthogonally therefrom. The mounting studs 76 are used to mount the inflator assembly 60 in a designated mounting location within a vehicle. In typical side impact airbag assemblies, the inflator assembly 60 and the fabric airbag are enclosed and mounted in a thin, rectangular plastic case installed within a vehicle seat.

Figure 4:
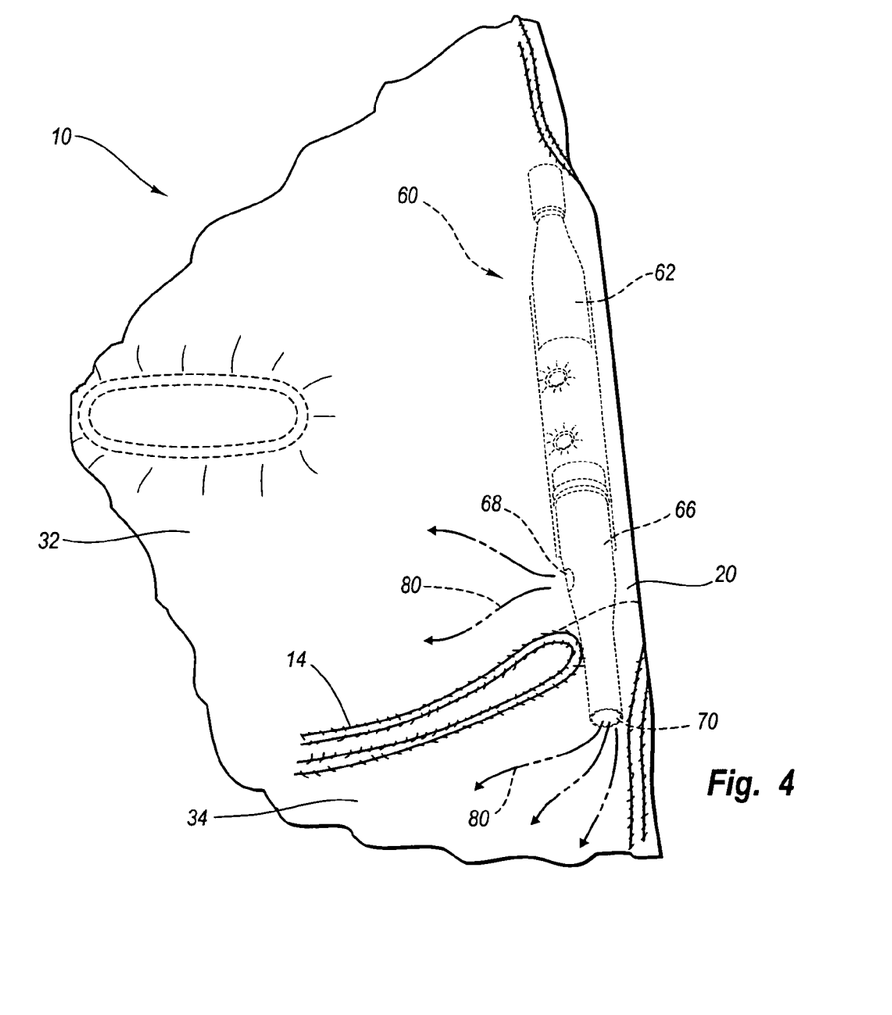
FIG. 4 is a perspective view of the inflator assembly of FIG. 3, shown positioned in the partially cut-away airbag cushion of the present invention.

Referring to FIG. 4, the inflator assembly 60 of FIG. 3 is illustrated from a perspective view within the side impact airbag 10 of the present invention. The airbag 10 is shown partially cut-away with the inflator assembly 60 illustrated in phantom. The inflator assembly 60 is placed into the airbag 10 through the throat 20. The throat 20 is then wrapped around the inflator assembly 60. The inflator assembly 60 is positioned within the airbag 10 so that the gas guide 66 intersects both the thorax/pelvic cushion 32 and the pelvic cushion 34. A seal comprising a seam 14 separates the two cushions 32, 34, leaving a small space through which the gas guide 66 may project. Once the gas guide 66 is inserted into position, the pelvic cushion 34 is sealed off from the thorax/pelvic cushion 32 so that inflation gases may not pass between the two to any appreciable degree.

Instead of a seam 14, the seal may alternatively be any number of constriction or attachment methods or mechanisms which prevent fluid communication between the pelvic cushion 34 and the thorax/pelvic cushion 32. Apart from fasteners, such as stitching 14, the seal may be created from RF welding, bonding, and the like.

The gas guide 66 is positioned in the airbag 10 so that the thorax chamber orifice 68 can direct inflation gas (represented by arrows 80) into the thorax/pelvic cushion 32. The pelvic chamber orifice 70 is positioned to deliver inflation gas 80 into the pelvic cushion 34. Once the inflator 62 is activated, inflation gas 80 is directed into both cushions 32, 34. Consequently, the pelvic cushion 34 and the thorax/pelvic cushion 32 simultaneously inflate. Simultaneous inflation means that the two cushions 32, 34 begin to inflate at the same time. However, for the cushions to simultaneously inflate, they do not necessarily need to be fully inflated at the same point in time. Since the pelvic cushion 34 is smaller than the thorax/pelvic cushion 32, the pelvic cushion 34 inflates more rapidly than the thorax/pelvic cushion 32. The relative sizes of the orifices 68, 70 work to regulate the pressures in each cushion, such that the internal pressure of the pelvic cushion 34 is greater than that of the thorax/pelvic cushion 32.

Figure 5:
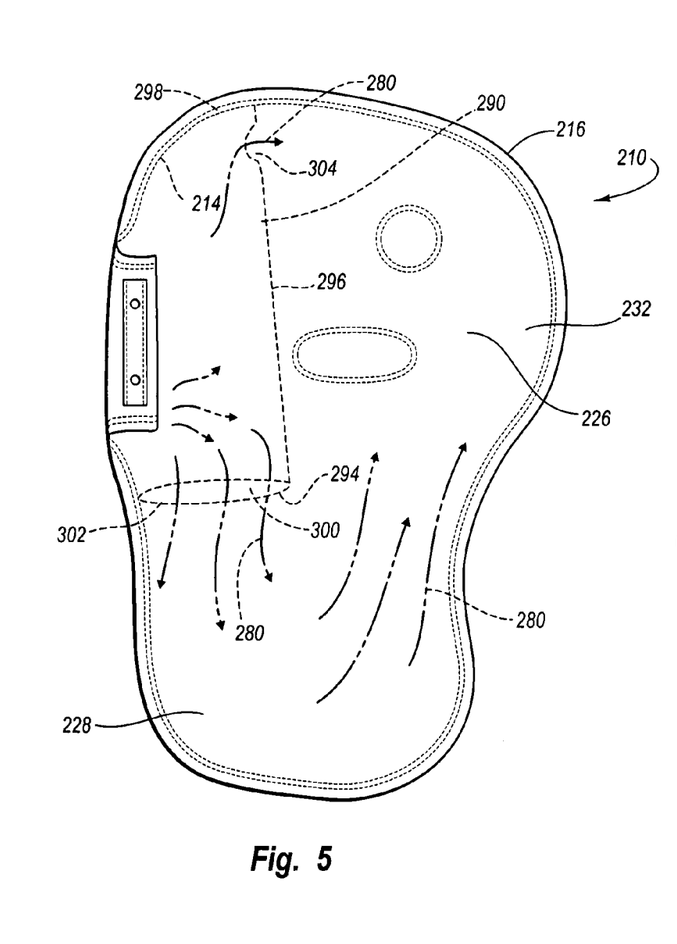
FIG. 5 is a side plan view of the inboard surface of a side impact airbag of the present invention having a diffuser hood located within the airbag chamber.
Figure 6:
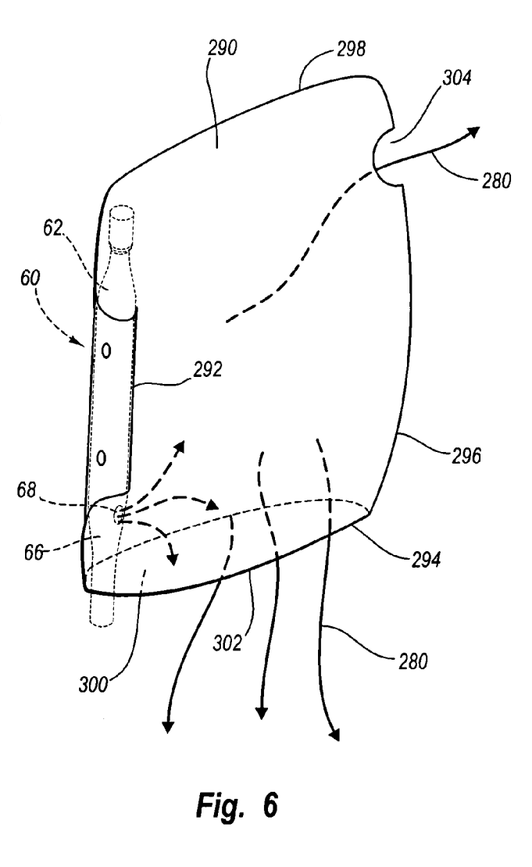
FIG. 6 is a perspective view of the diffuser hood of FIG. 5, absent the side impact airbag.

Referring to FIG. 5, a side impact airbag 210 is illustrated from a side plan view having a diffuser hood 290 located within the thorax/pelvic cushion 232. FIG. 6 shows the diffuser hood 290 from a perspective view removed from the side airbag and encasing an inflator assembly 60. The diffuser hood 290, also called a looped diffuser, is a piece of fabric or webbing with ends 292 that wrap around the inflator assembly 60, in a large loop 294.

The apex 296 of the loop 294 extends into the thorax/pelvic cushion 232 of the side impact airbag 210. The upper edge 298 of the diffuser hood 290 follows the profile of the peripheral edge 216 of the side airbag 210. The upper edge 298 is sealed through stitching 214 that is used to seal the peripheral edge 216 of the side airbag 210. However, the upper edge 298 may be sealed through alternative methods such as adhesive bonding, chemical bonding, radio frequency (RF) welding, ultrasonic welding, application of rigid mechanical fasteners, or the like.

The diffuser hood 290 has a first discharge opening 300 defined by the bottom edge 302 of the diffuser hood 290. Inflation gas, represented by arrows 280, may flow through the first discharge opening 300 because the bottom edge 302 of the diffuser hood 290 is not sealed like the upper edge 298. When the inflator 62 is activated, inflation gas 280 is directed into the thorax/pelvic cushion 232 through the thorax chamber orifice 68 of the inflator gas guide 66. Since the peripheral edges of the diffuser hood 290 are sealed, the inflation gas is directed downward through the first discharge opening 300 into the pelvic region 228 of the thorax/pelvic cushion 232. The diffuser hood 290 need not be of the looped configuration, but may be constructed from separate panels that are attached to the airbag 210 panel walls in such a manner as to initially shunt the inflation gas 280 into the pelvic region 228 of the thorax/pelvic cushion 232.

The diffuser hood 290 may also have a second discharge opening 304 adjacent its upper edge 298. The second discharge opening 304 may be an opening approximately 45 millimeters in diameter to allow a small amount of inflation gas 280 to exit the diffuser hood 290 directly into the thorax region 226 of the thorax/pelvic cushion 232. The second discharge opening 304 ensures that the thorax region 226 inflates in a timely manner. The size of the second discharge opening 304 is proportional to the desired rate of inflation of the thorax region 226 of the thorax/pelvic cushion 232. In alternative embodiments the second discharge opening 304 may be omitted entirely.

When inflation gas 280 enters the thorax/pelvic cushion 232, it is directed toward the pelvic region 228. As the pelvic region 228 of the thorax/pelvic cushion 232 inflates, it positions the inflating pelvic cushion (not shown) into its designated position because the two cushions share a fabric panel between each other. The designated position of the pelvic cushion is illustrated in FIG. 2 as being between an occupant's 140 pelvis and the side structure of a vehicle 144. The inflation of the pelvic region 228 of the thorax/pelvic cushion 232 rapidly positions the pelvic cushion into place to provide adequate side impact protection before intrusion into the vehicle compartment interferes with airbag deployment. Hence, the diffuser hood 290 is a structure for timely positioning the pelvic cushion in order to provide adequate impact protection for an occupant's pelvis.

After the inflation gas 280 is initially directed into the pelvic region 228 of the thorax/pelvic cushion 232, it diffuses into the thorax region 226, inflating the entire thorax/pelvic cushion 232 in order to provide sufficient impact protection for the occupant's thorax. However, initially shunting all the inflation gas 280 into the pelvic region 228 may prevent timely inflation and deployment of the thorax region 226 of the thorax/pelvic cushion 232. In order to ensure timely inflation and positioning of the entire thorax/pelvic cushion 232, the second discharge opening 304 is created in the diffuser hood 290.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An inflatable airbag assembly, comprising:
    a first fabric panel;
    a second fabric panel attached to the first fabric panel, the first and second fabric panels defining a first inflatable cushion;
    a third fabric panel attached to the second fabric panel, the second and third fabric panels defining a second inflatable cushion;
    a seal separating the first inflatable cushion from the second inflatable cushion preventing fluid communication between the first and second inflatable cushions; and
    an inflator inflator assembly positioned within the airbag system comprising a gas guide with a tapered cylindrical body wall, the gas guide intersects both the first inflatable cushion and the second inflatable cushion, wherein the gas guide comprises at least one outlet opening in the tapered cylindrical body wall positioned within the first inflatable cushion, wherein the seal separating the first inflatable cushion and the second inflatable cushion leaves a small space through which the gas guide projects, wherein once the gas guide is in position, the first cushion and the second cushion are sealed off so that inflation gas may not pass between the first cushion and the second cushion.

2. The airbag assembly of claim 1, further comprising a diffuser hood located within the first inflatable cushion.

3. The airbag assembly of claim 1, wherein the second inflatable cushion overlaps the first inflatable cushion.

4. The airbag assembly of claim 1, wherein the seal is a scam that runs laterally across a middle portion of the second fabric panel separating the first inflatable cushion from the second inflatable cushion.

5. The airbag assembly of claim 1, wherein the first fabric panel and the third fabric panel are attached to the second fabric panel through stitching.

6. The airbag assembly of claim 1, wherein the third fabric panel is located between the first and second fabric panels.

7. The airbag assembly of claim 1, wherein the first inflatable cushion is larger than the second inflatable cushion.

8. The airbag assembly of claim 1, wherein the first and second fabric panels define a throat for receiving an airbag inflator.

9. The airbag assembly of claim 1, wherein the inflator assembly simultaneously inflates the first and second inflatable cushions with inflation gas when activated.

10. The airbag assembly of claim 9, wherein the inflator assembly comprises a single inflator having a gas guide that includes a first orifice in fluid communication with the first inflatable cushion and a second orifice in fluid communication with the second inflatable cushion.

11. The airbag assembly of claim 10, wherein the second inflatable cushion is constructed to be inflated more rapidly than the first inflatable cushion.

12. The airbag assembly of claim 10, wherein the second inflatable cushion inflates to a greater pressure than the first inflatable cushion.

13. The airbag assembly of claim 9, wherein the inflation gas entering the first inflatable cushion is initially directed toward a portion of the first inflatable cushion adjacent the second inflatable cushion.

14. A side-impact inflatable airbag system, comprising:
a first inflatable cushion shaped to provide impact protection for a thorax and pelvic region of a projected position of a vehicular occupant:
a second inflatable cushion inflatable independent of the first inflatable cushion, the second inflatable cushion shaped to provide impact protection for the pelvic region of the projected position of the occupant and located adjacent a side of the first inflatable cushion furthest away from the projected position of the occupant; and
an inflator inflator assembly positioned within the side-impact system comprising a gas guide with a tapered cylindrical body wall, the gas guide intersects both the first inflatable cushion and the second inflatable cushion, wherein the gas guide comprises at least one outlet opening in the tapered cylindrical body all positioned within the first inflatable cushion, wherein a seal separates the first inflatable cushion and the second inflatable cushion leaving a small space through which the gas guide projects, wherein once the gas guide is in position, the first cushion and the second cushion are sealed off so that inflation gas may not pass between the two cushions and, wherein the inflator is constructed to inflate the second inflatable cushion at a higher pressure than the first inflatable cushion; and
a zero-length tether that controls width of the first inflatable cushion when inflated.

15. A side-impact inflatable airbag system, comprising:
a first inflatable cushion for providing impact protection for a thorax and pelvic region of a vehicular occupant:
a second inflatable cushion for providing impact protection for the pelvic region of the occupant, the second cushion for providing impact protection inflates independent of the first cushion for providing impact protection; and
an inflator inflator assembly positioned within the airbag system comprising a gas guide with a tapered cylindrical body wall, the gas guide intersects both the first inflatable cushion and the second inflatable cushion, wherein the gas guide comprises at least one outlet opening in the tapered cylindrical body wall positioned within the first inflatable cushion, wherein a seal separates the first inflatable cushion and the second inflatable cushion leaving a small space through which the gas guide projects, wherein once the gas guide is in position, the first cushion and the second cushion are sealed off so that inflation gas may not pass between the two cushions;
wherein the first inflatable cushion includes a diffuser hood that initially directs inflation gas toward the portion of the first inflatable cushion adjacent the second inflatable cushion.

16. The side-impact inflatable airbag system of claim 15, wherein the second cushion for providing impact protection overlaps the first cushion for providing impact protection.

17. The side-impact inflatable airbag system of claim 15, wherein the inflator assembly comprises a means for inflating the first and second cushion for providing impact protection.

18. The side-impact inflatable airbag system of claim 17, wherein the means for inflating inflates the second cushion for providing impact protection to a higher pressure than the first cushion for providing impact protection.

19. The side-impact inflatable airbag system of claim 15, further comprising means for positioning the second cushion for providing impact protection into the pelvic region of the occupant.

20. The side-impact inflatable airbag system of claim 19, wherein the means for positioning includes means for directing inflation gas toward a portion of the first cushion for providing impact protection that is shaped to be adjacent the pelvic region of the occupant.

* * * * *

UNITED STATES PATENT AND TRADEMARK OFFICE
CERTIFICATE OF CORRECTION

PATENT NO. : 7,347,444 B2
APPLICATION NO. : 10/841342
DATED : March 25, 2008
INVENTOR(S) : Terry A. Wheelwright It is certified that error appears in the above-identified patent and that said Letters Patent is hereby corrected as shown below:

In column 10, line 62, please replace "an inflator inflator assembly positioned within the airbag" with --an inflator assembly positioned within the airbag--.

In column 11, line 13, please replace "scam that runs laterally across a middle portion" with --seam that runs laterally across a middle portion--.

In column 11, line 56, please replace "an inflator inflator assembly positioned within the airbag" with --an inflator assembly positioned within the airbag--.

In column 12, line 21, please replace "an inflator inflator assembly positioned within the airbag" with --an inflator assembly positioned within the airbag--.

Signed and Sealed this

Second Day of September, 2008

JON W. DUDAS
*Director of the United States Patent and Trademark Office*